United States Patent Office 3,072,699
Patented Jan. 8, 1963

3,072,699
REACTION PRODUCTS OF BORON HYDRIDES WITH VINYL CONTAINING SILICON, ALUMINUM OR BERYLLIUM COMPOUNDS
Hugh E. Ramsden, Scotch Plains, N.J., assignor to Metal & Thermit Corporation, Woodbridge Township, N.J., a corporation of New Jersey
No Drawing. Filed Mar. 2, 1959, Ser. No. 796,291
16 Claims. (Cl. 260—448.2)

The present invention relates to novel boron hydride-containing materials and to their preparation.

The oxidation of a boron hydride releases large amounts of energy. The complete reaction of stoichiometric mixtures of a boron hydride and oxygen releases approximately fifty percent more energy per pound of boron hydride than does a stoichiometric mixture of a hydrocarbon and oxygen per pound of hydrocarbon. This high-energy release, in conjunction with the very rapid oxidation of boron hydride materials generally, makes the boron hydrides useful fuels. Unfortunately, the boron hydrides per se are difficult to utilize, being corrosive, highly toxic, etc. A need exists to modify these boron hydride materials so that they may be more easily handled and stored, and yet not decrease their energy release characteristics, or to decrease these characteristics in a minimal manner.

The oxidation of beryllium, aluminum, or silicon is also a useful source of high energy. For example, the oxidation of beryllium releases energy in the order of magnitude of 28,000 B.t.u./lb..

It is therefore an object of the present invention to provide a material which combines the useful high-energy characteristics of both the boron hydrides and the metals beryllium, aluminum or silicon.

A further object of this invention is to provide a modified boron hydride-metal system so as to achieve a combination of energy-rich materials in a form which is more easily handled and less toxic than are the borane materials themselves.

It is also an object of this invention to provide modified boron hydride materials containing a maximum of boron-hydrogen bonds and a minimum of energy-reducing hydrocarbon groups.

Another object of the present invention is to provide a process for producing boron hydride-containing materials useful as high-energy materials.

Still another object of this invention is to provide modified boron hydride-containing materials which are liquids.

It is still another object of this invention to provide modified boron hydride-containing materials which are solids.

A further object of this invention is to provide hydride-containing materials which are of such a nature that they are compatible with other fuel components, both of the liquid and of the solid types.

Other objects will be apparent to those skilled in the art and will be also more fully developed in the following subject-matter of the specification.

In accordance with this invention, there is provided as a composition of matter a boron hydride derivative comprising the addition product of a boron hydride with a vinyl metal material, wherein the metal is selected from the class consisting of beryllium, aluminum and silicon. These novel compositions are prepared by reacting a boron hydride with the vinyl metal compound. The boron hydride reactant is added in such a ratio to the vinyl metal reactant so as to obtain a final adduct having still available boron to hydrogen linkages providing centers of high energy.

Illustrative of the reaction in its most simple form is the reaction of diborane with vinylaluminum compounds, as follows:

(1) $3B_2H_6 + (CH_2=CH)_3Al \rightarrow (B_2H_5CH_2-CH_2)_3Al$
(2) $2B_2H_6 + (CH_2=CH)_2AlCH_3$
$\rightarrow (B_2H_5CH_2CH_2)_2AlCH_3$
(3) $B_2H_6 + CH_2=CHAl(CH_3)_2 \rightarrow B_2H_5C_2H_4Al(CH_3)_2$ Thus, it can be seen that where the proper ratio of the boron hydride is added to a vinylated metal, in this case a vinylated aluminum, it is possible to obtain a monomeric, boron hydride-containing, energy-rich material. It will also be noted that when the metal (aluminum) is modified by an alkyl group in addition to the vinyl grouping, it is preferably modified by a methyl grouping, as illustrated. This is in accordance with the intention of the invention to provide the minimum hydrocarbon dilution of the energy-rich material consistent with obtaining an easily-handled boron hydride material which is in a liquid or a solid form, as desired, and which is more readily utilized.

Further illustrations of the reaction in its simple aspects can be gathered from the following series of equations in which a boron hydride (illustrated by dihydropentaborane) is added to a vinyl silicon material:

(4) $4B_5H_{11} + (CH_2=CH)_4Si \rightarrow (B_5H_{10}CH_2CH_2)_4Si$
(5) $3B_5H_{11} + (CH_2=CH)_3SiH \rightarrow (B_5H_{10}CH_2CH_2)_3SiH$
(6) $3B_5H_{11} + (CH_2=CH)_3SiCH_3$
$\rightarrow (B_5H_{10}CH_2CH_2)_3SiCH_3$
(7) $2B_5H_{11} + (CH_2=CH)_2SiH_2 \rightarrow (B_5H_{10}CH_2CH_2)_2SiH_2$
(8) $2B_5H_{11} + (CH_2=CH)_2Si(CH_3)_2$
$\rightarrow (B_5H_{10}CH_2CH_2)_2Si(CH_3)_2$ Broadly speaking, the invention provides a method for the formation of novel materials containing at least one structural configuration in its molecular formula of a boron to ethylene to metal linkage as follows:

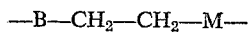

wherein the boron is derived from or is part of a borane residue, and the metal is at least one of the following: aluminum, beryllium or silicon. While some of the boron atoms are linked to metal atoms through an ethylene group, other boron atoms have residual high-energy linkages to hydrogen. Cyclic structures are also entirely possible in the monomeric compounds of this invention, for example:

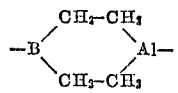

Because of the nature of the reactants and of the final products, as well as their extremely high reactivity, it is not possible to state with any definiteness the final structures obtained by the reaction of the boron hydride and the vinyl metal compounds. Although there are set forth in the specification certain chemical formulations which are attempts to set out the probable course of the reaction for explanatory purposes, this invention is not to be limited by any specific chemical structure designated for either a monomeric product or a polymeric material wherein the polymer is linear or is cross-linked via boron-hydrogen-vinyl reactions or by true ethylenic reactions.

The borane residue adds across the vinyl linkage and may remain intact as the particular borane moiety which is adding. It is also possible that the borane moiety fragments into lesser moieties or accretes. In any event, the boron molecule retains, either alone or in combination with other borons, residual energy-rich boron to hydrogen linkages. This is illustrated as follows:

(9) $2B_2H_6 + (CH_2=CH)_2Be$
$\rightarrow (B_2H_5-CH_2-CH_2)_2Be$ (direct)

(10) $4B_2H_6 + (CH_2=CH)_2Be$
$\rightarrow (B_4H_9—CH_2—CH_2)_2Be + 2H_2$ (accretion)

(11) $B_2H_6 + (CH_2=CH)_2Be$
$\rightarrow (BH_2—CH_2—CH_2)_2Be$ (fragmentation)

It is apparent that where the boron has at least two hydrogen atoms which are active in the addition reaction and where the vinyl metal compound has at least two vinyl groups, it is possible to form two products in addition to the straight chain monomer. This can be understood by the following equation:

(12) 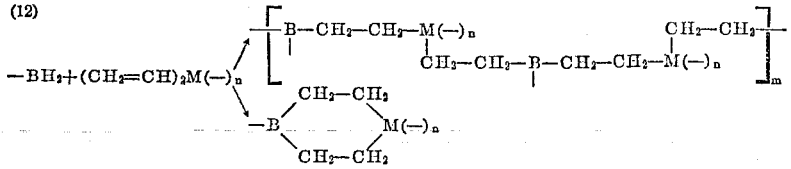

wherein $m$ indicates the particular length of the polymeric chain and $n$ is the valence of the metal (M) less two. It is obvious that the terminal boron atoms are borane-containing materials having one or more high-energy boron to hydrogen linkages.

It is also further evident that cross-linking can occur between the polymeric boron chain by reaction of residual hydrogen-boron materials on the polymeric chain with a further molecule of divinyl, trivinyl, or tetravinyl metal compound. This can be illustrated as follows:

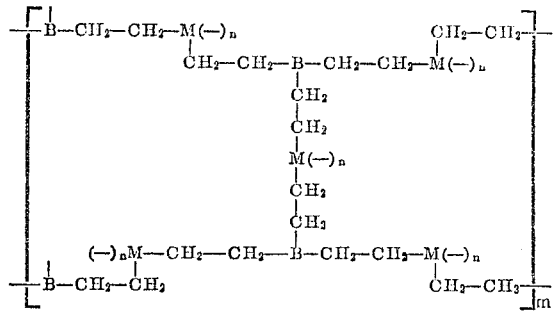

wherein $m$ will designate the length of the polymeric chain and $n$ is the valence of metal (M) less two. The extent of cross-linking will, of course, determine whether a liquid, glassy or solid product is obtained as is usual in polymeric systems.

Where the boron hydride is added to a tri- or tetra-vinyl metal compound, it is possible to have cross-linking occur either (1) as shown above, or (2) through the usual polymerization of vinyl groups in the presence of ultraviolet light or polymerization catalysts. A cross-linked chain of this sort can be exemplified as seen in the following formula:

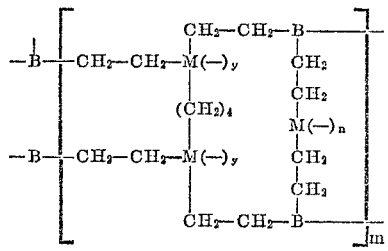

wherein $m$ is dependent on the length of the polymeric chain, $n$ is the valence of the metal less two, and $y$ is the valence of the metal less three. The cross-linking will not necessarily take place on proximate boron atoms, as is illustrated here merely for convenience. Cross-linking of such cyclic structures or polymerization of such cyclic structures can also take place.

It is to be understood that in all the above reactions, the borane can be reacted with a mixture of, as well as the individual vinyl metal compounds enumerated as forming part of this invention.

The formation of various vinylated and fully vinylated beryllium, aluminum and silicon compounds is described in co-pending U.S. applications Serial Nos. 671,375, now abandoned, 671,376 now U.S. Patent No. 3,010,985, and 549,556, now U.S. Patent No. 2,894,012, respectively. The only requirement of the vinyl metal reactant for use in the process is that the metal atom be bonded to at least one vinyl group. The other valences of the metal may be bonded to other vinyl groups, to hydrogen atoms, or to other desired groups, dependent on the desired properties of the final product. To maintain low hydrocarbon dilution when the vinyl metal reactant has other hydrocarbon groups, the methyl and ethyl groups are preferred. However, larger groups such as phenyl, benzyl, octyl, etc. may be used to obtain desired properties at the expense of the high energy release characteristics.

The boron hydrides which can be utilized as a reactant in the present invention include diborane, tetraborane, pentaboranes (9 and 11), hexaborane, decaborane, and also ethyldecaborane. In practice, it is easiest to use the pentaboranes and decaboranes. Mixtures of the enumerated boranes may be used as well as the individual boranes. The alkyl boron hydrides may also be used. The alkyl-substituted diboranes are easily prepared by allowing a mixture of diborane and trialkylborane ($BR_3$) to come to equilibrium at room temperature. The mixture is then frozen and carefully fractionated at low temperatures in a vacuum system to get a series of alkyl-substituted derivatives which can be utilized as reactants in the present invention. Since the existence of the pure alkyl diboranes at room temperature is relatively transient, the equilibrium mixture can be reacted in situ, without fractionation, with a vinyl metal material as discussed above to give the novel products of this invention.

The number and kind of substituents on the vinyl metal reactant and on the particular borane is dependent on the nature of the final boron-ethylene-metal product desired. The choice will be dependent on the amount of energy-rich bonds desired in the product together with the other physical and chemical properties desired. The product may be varied to achieve the most desirable energy level consistent with compatibility in the fuel system contemplated.

In the practice of this invention, the vinyl metal compound and the boron hydride reactant are kept together without exposure to extraneous matter for relatively long reaction periods at a temperature which may vary greatly, dependent on the reactants utilized. Generally, the reaction is at temperatures between about $-50°$ C. to about $100°$ C. For the more stable boron materials, e.g., decaborane, it might be substantially higher. It is preferred to use stoichiometric quantities (based on the products desired) of vinyl metal compound and boron hydride reactant. Non-reactive solvents such as tetrahydrofuran, hydrocarbons or mixtures thereof may be advantageously employed as the reaction medium.

When the reaction is completed, the product may be utilized by removing in vacuo excess vinyl metal compound, solvent, and unreacted boron hydride. The residual liquid or solid boron-ethylene-metal product is then suitable for its intended use without further purification.

For the purpose of giving those skilled in the art a better understanding of the invention, the following illustrative examples are given.

EXAMPLES (1) $4B_2H_6 + (CH_2=CH)_4Si$

To a 10% by weight solution of tetravinyl silicon in 50:50 tetrahydrofuran/n-pentane is added 4 moles of diborane over a period of 2 hours while maintaining the reaction mixture at room temperature. The reaction mixture is then slowly brought over a period of 4 hours to a temperature of 100° C. with constant mixing and maintained at 100° C. temperature for a further period of up to 19 hours. After the reaction is over, the mixture is brought to room temperature and evacuated for a period of ¾ of an hour until a pressure of about 0.1 mm. is obtained. Then heating is applied until all of the normal pentane and tetrahydrofuran remaining is distilled over (up to a temperature of 45° C. at pressures of about 0.1 mm. to about 0.01 mm.). There results from this reaction a glassy, pasty, yellow-tinged product.

(2)        $4B_{10}H_{14} + (CH_2=CH)_4Si$

To a solution containing a ratio of 4 moles of decaborane and tetrahydrofuran in 10% concentration by weight is added 1 mole in 10% concentration by weight of tetravinylsilicon and tetrahydrofuran over a period of 15 minutes. The reaction vessel is then sealed, and slowly brought to a temperature of 80° C. and maintained at that temperature for 48 hours. After the reaction is over the mixture is evacuated under high vacuum, and all tetrahydrofuran as well as other volatile materials is removed by heating the resultant mixture up to a temperature of 50° C. at up to 0.01 mm. pressure. There results as a final product a colorless, crystalline material.

(3)        $3B_5H_9 + (CH_2=CH)_3Al$

To 1.0 mole of aluminum trichloride in tetrahydrofuran is added 3 moles of vinylmagnesium chloride to form trivinyl aluminum. After the addition of the vinylmagnesium chloride, the reaction mixture is refluxed for 5 hours, and then diluted to half its volume with n-pentane. Magnesium chloride is removed by filtration, and the filtered liquid is concentrated to form a solution of trivinyl aluminum of about 10% by weight of total volume of tetrahydrofuran and n-pentane. To the solution is added 3 moles of pentaborane, and the mixture maintained at about 70° C. for 24 hours. After this period of time, the mixture is brought to room temperature and vacuum evaporated, keeping the temperature no higher than around 50° C. and having a pressure no greater than about 0.1 to 0.01 mm. There results a solid glass as a final product.

(4)        $2B_{10}H_{14} + (CH_2=CH)_2Be$

To a solution of 10% by weight of divinyl beryllium in tetrahydrofuran is added 2 moles of decaborane, and the resultant mixture kept at 70-75° C. for up to 48 hours. At this time the mixture is brought to room temperature and evacuated until about 0.1 mm. pressure is obtained at room temperature. The mixture is then heated to about 45-50° C. under reduced pressure until a pressure of 0.01 mm. vacuum is obtained. The product is a crystalline material.

(5)        $2B_2H_6 + (CH_2=CH)_2Be$

To a 10% solution of 1 mole of divinyl beryllium in tetrahydrofuran is added 2 moles of diborane over a period of 1 to 2 hours at room temperature. The mixture which results is then warmed gradually over a period of 3 hours to a temperature of 55° C., and maintained at that temperature for 32 hours. The resulting product is then brought back to room temperature and evacuated under reduced atmospheric pressure until a vacuum is obtained of 0.1 mm. Then the mixture is heated to 45-50° C. until the pressure is constant at 0.01 mm. and no further volatiles are obtained. The resultant product is an oily, pasty material.

(6)        $3B_5H_9 + (CH_2=CH)_4Si$

To a 1 molar 10% solution of tetravinyl silicon in tetrahydrofuran is added 3 moles of pentaborane over a period of 1 hour. The mixture is then brought to a temperature of about 60-70° C. for a period of 48 hours. The resultant reaction mixture is then brought to room temperature and evacuated until a reading of 0.1 mm. pressure is obtained. Then it is gradually heated to 50-60° C. at a pressure of about 0.01 mm. until no further volatiles distill over. There results a very hard solid as a product.

(7)        $3B_2H_6 + (CH_2=CH)_4Si$

A 3 molar ratio of diborane and a 1 molar ratio of tetravinyl silicon are brought together in approximately a 10% by weight solution in tetrahydrofuran at about 60-70° C. for a period of 48 hours. After that time all solvent is removed at a temperature of about 50-60° C. at a pressure of up to about 0.01 mm. There results a powdery solid.

(8)        $B_6H_{10} + (CH_2=CH)_2Be$

A mixture of about 10% by weight containing a molar ratio of 1 mole of hexaborane and 1 mole of divinylberyllium is prepared in tetrahydrofuran at room temperature. This is maintained at a temperature of 60-65° C. for a period of 15 hours. Then the mixture is permitted to stand further and irradiated with ultra-violet light. The resultant mixture after radiation for a period of about 12 hours is brought to room temperature and the solvents which can be removed by evacuation to a vacuum pressure of 0.01 mm. are removed. The mixture is heated gradually to a temperature of about 50-55° C. to remove all remaining volatiles at a pressure of about 0.01 mm. There results a tannish, solid product.

(9)        $B_2H_6 + (CH_2=CH)_2Be$

A ratio of about 1 mole of diborane and 1 mole of divinylberyllium in a 10% by weight solution in tetrahydrofuran is brought together at room temperature. The reaction mixture is maintained at a temperature of about 60-65° C. for a period of 12 hours, and then subjected to radiation by ultraviolet light for a further period of about 12 hours. The resultant mixture is stripped of all solvents by evacuation to 0.01 mm. at about 50-55° C. There results a powdery solid material.

(10)        $B_6H_{10} + (CH_2=CH)_2Be$

A 10% by weight solution of 1 mole of hexaborane and 1 mole of divinylberyllium is prepared at room temperature and the mixture is then brought over a period of 5 hours to a temperature of 65-75° C. and maintained at that temperature for a period of 32 hours. All volatiles which can be recovered at a temperature of up to 50-60° C. at a pressure of 0.01 mm. are removed and there results a dark tannish, solid product.

(11)        $B_2H_6 + (CH_2=CH)_2Be$

A 10% by weight solution containing a 1:1 molar ratio of diborane to divinylberyllium is prepared and kept at 50° C. for a period of 12 hours. The resultant volatiles which can be removed up to a temperature of 45-50° C. at a pressure of 0.01 mm. are removed. There results a pasty, liquid residue as a product.

(12)        $3B_5H_9 + (CH_2=CH)_3SiH$

A 10% by weight solution containing a 3:1 molar ratio of pentaborane to trivinyl silicon hydride is prepared at room temperature and then maintained at a temperature of 55-60° C. for a period of 51 hours. The resultant reaction mixture is relieved of volatiles by distillation up to a temperature of 50° C. at 0.01 mm. pressure. The product resulting is a glassy solid.

(13)        $3B_5H_9 + (CH_2=CH)_3SiCH_3$

A 10% (approximately) by weight reaction mixture containing a ratio of 3 moles of pentaborane and 1 mole of trivinylmethyl silicon is prepared at room temperature and then maintained at 60-65° C. for a period of 32 hours. The final product which results after removal of all volatiles at a pressure of 0.01 mm. up to a temperature of 55° C. is a tannish solid.

(14) $\quad 2B_4H_{10}+(CH_2{=}CH)_2Be$

To tetrahydrofuran is added 2 moles of tetraborane and then 1 mole of divinylberyllium is added to make a 10% by weight reaction mixture in tetrahydrofuran. The reaction mixture is then brought to a temperature of 60° C. for a period of 26 hours. All the volatiles which can be removed are taken off at a pressure of 0.01 mm. at a temperature of distillation up to about 50–55° C. The resultant product is a brownish fluid which turns solid on standing after a period of 3 weeks.

(15) $\quad 6B_2H_6+(CH_2{=}CH)_4Si+2(CH_2{=}CH)_2Be$

A reaction mixture is prepared containing a total 10% by weight of reaction mixture in which there is a ratio of 6 moles of diborane, 1 mole of tetravinyl silicon and 2 miles of divinylberyllium at room temperature. The reaction mixture is then maintained at 60–65° C. for a period of 28 hours. All volatiles are collected by distillation at a temperature of about 50–60° C. at a pressure of 0.001 mm. The resultant product was a deep tan solid.

(16) $\quad 4B_6H_{10}+(CH_2{=}CH)_2Be+(CH_2{=}CH)_3Al$

A reaction mixture containing 10% by weight of reaction materials comprising a ratio of 4 moles of hexaborane, 1 mole of divinylberyllium and 1 mole of trivinylaluminum is prepared at room temperature and then brought to 60–65° C. for a period of 26 hours. All volatiles are removed by distillation up to 60° C. at 0.01 mm. pressure. There results a tannish, brittle solid.

(17) $\quad 4B_5H_9+(CH_2{=}CH)_2Be+(CH_2{=}CH)_3SiCH_3$

In tetrahydrofuran is prepared a reaction mixture of 10% by weight of a ratio of 4 moles of pentaborane, 1 mole of divinylberyllium and 1 mole of trivinylmethyl silicon at room temperature. The reaction is then brought to a temperature of 60° C. for a period of 22 hours. To the resultant reaction is then added one-tenth of 1% benzoyl peroxide, and the reaction mixture maintained at 60° C. for a further period of 6 hours. All the volatiles are removed by distillation at 60–63° C. at up to 0.01 mm. pressure. There results a powdery, amorphous, tannish solid.

(18) $\quad B_2H_6+(CH_3)_3B+(CH_2{=}CH)_2Be$

To a solution containing 2 moles of diborane in tetrahydrofuran (10% by weight) is added 1 mole of trimethylboron and the resultant reaction mixture permitted to equilibrate for 24 hours. To the equilibrated mixture is added 1 mole of divinyl beryllium and the resultant mixture maintained at 60–70° C. for a period of 22 hours. All volatiles are thereafter removed by distillation at a temperature up to 65° C. at a pressure up to 0.01 mm. There results a tarry, tan colored glass.

(19) $\quad B_2H_6+(CH_2{=}CH)_2AlH$

A 10% by weight solution containing a 1:1 molar ratio of diborane to divinylaluminum hydride, prepared by reacting divinylaluminum chloride with lithium aluminum hydride, is kept at 50° C. for a period of 12 hours. The resultant volatiles which can be removed up to a temperature of 45–50° C. at a pressure of 0.01 mm. are removed. There is obtained a viscous, yellowish liquid as a product.

(20) $\quad B_2H_6+CH_2{=}CH{-}BeH$

A solution containing about 10% by weight of a 1:2 molar ratio of diborane and vinylberyllium hydride, prepared by reacting vinylberyllium chloride with lithium aluminum hydride, is kept at about 50° C. for a period of 18 hours. Volatiles removable at up to 50° C. at a pressure of 0.01 mm. are pumped off to obtain the viscous, liquid product.

Those compounds of this invention which are liquid are useful as liquid propellants themselves in special situations. They are also useful as direct blends with hydrocarbon fuels for reaction motors or for jets. The solid fuel compositions utilize the products of this invention alone or as a blend. A binder is used, when desired. Regulators and oxidizers are usually present. The oxidizers are usually the nitrates or perchlorates of potassium, sodium, magnesium, lithium, ammonium, etc. The proportion of fuel polymer to oxidizer is usually in the ratio of about one to four to vary performance. The solid fuels or blends are used as fuels for rockets, high pressure jets for cutting, oil well perforation, drilling operations, underwater propulsion devices, and in general, where a high-energy, short duration impulse is required.

As many embodiments of this invention may be made without departing from the spirit and scope thereof, it is to be understood that the invention includes all such modifications and variations as come within the scope of the appended claims.

What is claimed is:

1. The reaction product of a borane selected from the class consisting of diborane, tetraborane, pentaborane-9, pentaborane-11, hexaborane, decaborane, and ethyldecaborane and a metal compound wherein the metal is selected from the class consisting of beryllium, aluminum and silicon and the metal compound has at least one vinyl group bonded to the metal atom and is selected from the class consisting of hydrocarbometals and hydrocarbometal hydrides, said reaction product being characterized as having been formed by the addition of the borane as hydrogen and a borane residue to the double bond of at least one vinyl group of the metal compound so as to provide at least one boron-ethylene-metal bridge joining the borane and metal compound residues.

2. A composition according to claim 1 wherein the metal compound is a hydrocarbometal having only vinyl groups bonded to the metal atom.

3. A composition according to claim 1 wherein the compound is a hydrocarbometal having at least one methyl group bonded to the metal atom in addition to at least one vinyl group.

4. A composition according to claim 2 wherein the reaction product is polymeric.

5. A composition according to claim 2 wherein the ratio of borane residues to ethylene groups is about 1:1.

6. A composition according to claim 2 in which the ratio of borane residues to ethylene groups is about 1:2.

7. A composition according to claim 1 wherein the metal compound is a hydrocarbometal hydride having at least one hydrogen bonded to the metal atom in addition to at least one vinyl group.

8. A process for preparing a reaction product of a borane selected from the class consisting of diborane, tetraborane, pentaborane-9, pentaborane-11, hexaborane, decaborane, and ethyldecaborane and a metal compound, said reaction product having at least one boron-ethylene-metal bridge joining the borane and metal compound residues, which comprises reacting the borane, with a metal compound having at least one vinyl group bonded to the metal atom, said metal atom being selected from the class consisting of beryllium, aluminum and silicon and said metal compound being selected from the class consisting of hydrocarbometals and hydrocarbometal hydrides, the molar ratio of metal compound to borane being sufficient to provide at least one vinyl group for each borane molecule.

9. A process according to claim 8 wherein the metal compound is trivinylsilicon hydride.

10. A process according to claim 8 wherein the metal compound has only vinyl groups bonded to the metal atom.

11. A process according to claim 8 wherein the ratio of moles of borane to vinyl groups of the metal compound is about 1:1.

12. A process according to claim 8 wherein the ratio of moles of borane to vinyl groups of the metal compound is about 1:2.

13. A process according to claim 8 wherein a vinyl polymerization catalyst is present during the reaction.

14. A process according to claim 8 wherein the metal compound has lower alkyl groups bonded to the metal.

15. A process according to claim 14 wherein the lower alkyl group is methyl.

16. A process according to claim 8 wherein the reaction is conducted in tetrahydrofuran as a reaction medium.

References Cited in the file of this patent

UNITED STATES PATENTS

| | | |
|---|---|---|
| 2,685,575 | Heiligmann et al. | Aug. 3, 1954 |
| 2,831,009 | Seyferth | Apr. 15, 1958 |
| 2,835,690 | Prober | May 20, 1958 |

OTHER REFERENCES

Seyferth: Jour. Inorganic and Nuclear Chemistry, vol. 7 (1958), pages 152–3.